US008411038B2

(12) United States Patent
Adams et al.

(10) Patent No.: US 8,411,038 B2
(45) Date of Patent: Apr. 2, 2013

(54) MULTI-LAYER INTEGRAL KEYPAD

(75) Inventors: Bryan Adams, Dayton, OH (US); Chad J. Mefford, Springfield, OH (US)

(73) Assignee: Angell-Demmel North America Corporation, Dayton, OH (US)

( * ) Notice: Subject to any disclaimer, the term of this patent is extended or adjusted under 35 U.S.C. 154(b) by 0 days.

(21) Appl. No.: 13/119,113

(22) PCT Filed: Sep. 16, 2009

(86) PCT No.: PCT/US2009/057145

§ 371 (c)(1), (2), (4) Date: May 20, 2011

(87) PCT Pub. No.: WO2010/033582

PCT Pub. Date: Mar. 25, 2010

(65) Prior Publication Data

US 2011/0216008 A1 Sep. 8, 2011

Related U.S. Application Data

(60) Provisional application No. 61/097,417, filed on Sep. 16, 2008.

(51) Int. Cl.
*G06F 3/02* (2006.01)

(52) U.S. Cl. ........................... 345/168; 200/341; 341/22

(58) Field of Classification Search .......... 345/168–172; 200/237–345; 341/22–34; 708/142–146; 455/186.2

See application file for complete search history.

(56) References Cited

U.S. PATENT DOCUMENTS

| | | | | |
|---|---|---|---|---|
| 3,515,835 A | | 6/1970 | Debras | |
| 4,366,463 A | | 12/1982 | Barker | |
| 4,937,408 A | | 6/1990 | Hattori et al. | |
| 5,144,103 A | * | 9/1992 | Suwa | 200/344 |
| 5,266,949 A | | 11/1993 | Rossi | |
| 5,491,313 A | | 2/1996 | Bartley et al. | |
| 5,536,543 A | | 7/1996 | Papandreou | |
| 5,573,107 A | | 11/1996 | Nakano et al. | |
| 5,655,826 A | | 8/1997 | Kouno et al. | |
| 5,681,515 A | | 10/1997 | Pratt et al. | |
| 5,911,317 A | | 6/1999 | Tsai | |
| 5,969,644 A | * | 10/1999 | Koutaka | 341/22 |
| 5,973,622 A | | 10/1999 | Chiang | |
| 6,057,517 A | | 5/2000 | Meyer | |
| 6,094,191 A | * | 7/2000 | Watanabe et al. | 345/168 |
| 6,158,867 A | | 12/2000 | Parker et al. | |
| 6,217,183 B1 | | 4/2001 | Shipman | |
| D460,754 S | | 7/2002 | Ruohonen | |

(Continued)

FOREIGN PATENT DOCUMENTS

| | | |
|---|---|---|
| EP | 1881512 A2 | 1/2008 |
| JP | 6150770 | 5/1994 |

(Continued)

OTHER PUBLICATIONS

International Searching Authority, International Search Report and Written Opinion, Apr. 14, 2010, pp. 1-11.

*Primary Examiner* — Liliana Cerullo

(74) *Attorney, Agent, or Firm* — Middleton Reutlinger; Scott W. Higdon

(57) ABSTRACT

A multi-layer integral keypad (10) is provided with a plurality of key tops (20) each having a plastic layer (30) coupled to a display layer (21). A key top support layer (40) integrally couples a plurality of the key tops (20) to one another. A method for producing a multi-layer integral keypad (10) is also provided.

21 Claims, 12 Drawing Sheets

U.S. PATENT DOCUMENTS 6,462,294 B2 10/2002 Davidson et al.
6,603,083 B2 8/2003 Amari et al.
6,621,027 B1 9/2003 Shimizu et al.
6,737,596 B1 5/2004 Hein
6,766,023 B2 7/2004 Kiernan
6,770,212 B2 8/2004 Hayashizaki
7,134,205 B2 11/2006 Bruennel
7,243,472 B2 7/2007 Taemmerich
7,340,273 B2 3/2008 Ono
7,378,607 B2 5/2008 Koyano et al.
7,781,690 B2 * 8/2010 Ishii .............................. 200/341
2003/0160712 A1 8/2003 Levy
2003/0209416 A1 11/2003 Tsai
2005/0139457 A1 6/2005 Levy
2006/0019065 A1 1/2006 Taemmerich et al.
2006/0062624 A1 3/2006 Choi
2007/0051603 A1 * 3/2007 Hakunti et al. ............... 200/310
2007/0084710 A1 4/2007 Koyano et al.

FOREIGN PATENT DOCUMENTS

JP 2005259597 9/2005
WO 2010033582 A3 3/2010

* cited by examiner

MULTI-LAYER INTEGRAL KEYPAD

CROSS REFERENCE TO PRIOR APPLICATION

This application is a national stage filing (35 U.S.C. §371) of PCT/US2009/057145, filed on 16 Sep. 2009 which claims priority to and benefit from U.S. Provisional Patent Application Ser. No. 61/097,417, filed on 16 Sep. 2008.

TECHNICAL FIELD

This invention pertains to keypads, and more specifically to keypads having a plurality of keys coupled to one another as an integral unit.

BACKGROUND

A variety of keypads exist that are used for actuating corresponding switches of an electronic device. For example, computer keyboards often comprise a plurality of separate non-integral keycaps that are individually affixed to the computer keyboard. The keycaps may be individually actuated by a user, thereby causing the keycap to actuate a corresponding switch of the keyboard that is in electrical communication with an electrical circuit of the keyboard.

BRIEF DESCRIPTION OF THE ILLUSTRATIONS

SUMMARY

Figure 1:
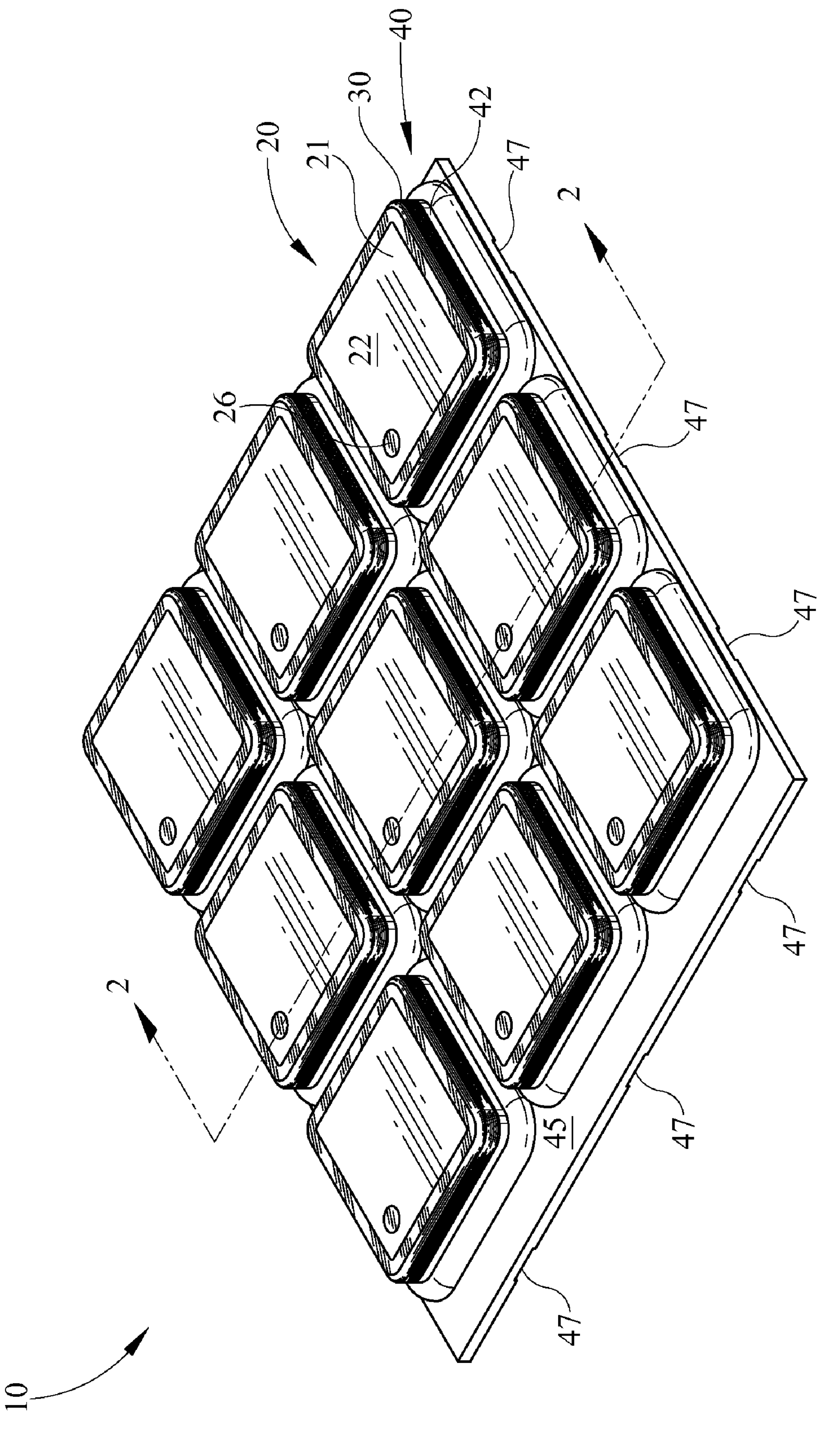
FIG. 1 is a top perspective view of a first embodiment of a multi-layer integral keypad.

A multi-layer integral keypad is provided with a plurality of key tops each having a plastic layer coupled to a display layer. A resilient key top support layer integrally couples a plurality of the key tops to one another. A method for producing a multi-layer integral keypad is also provided.

DETAILED DESCRIPTION

It is to be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," "in communication with" and "mounted," and variations thereof herein are used broadly and encompass direct and indirect connections, couplings, and mountings. In addition, the terms "connected" and "coupled" and variations thereof are not restricted to physical or mechanical connections or couplings. Furthermore, and as described in subsequent paragraphs, the specific mechanical configurations illustrated in the drawings are intended to exemplify embodiments of the invention and that other alternative mechanical configurations are possible.

Referring now to FIG. 1 through FIG. 4, a first embodiment of a multi-layer integral keypad 10 is shown. As used herein, "integral" means composed of a plurality of parts that are coupled to one another to make a whole. The depicted embodiment of the multi-layer integral keypad 10 has nine key tops 20 each supported by, and coupled to one another by, a key top support layer 40. Each key top 20 has a metal display layer 21 having a display surface 22 and a back surface 24. In some embodiments display layer 21 may be decorated aluminum. In other embodiments, display layer 21 may comprise other metal materials such as, for example, stainless steel, non-decorated aluminum, or a decorated composite metal. In other embodiments display layer 21 may comprise a thin non-metallic film such as, for example, a plastic film or ceramic film. Although in the depicted embodiment a flat and square display surface 22 and back surface 24 are shown, display surface 22 and/or back surface 24 may take on a number of contours, shapes, and textures. For example, in some embodiments display layer 21 may be generally annular and display surface 22 may be non-planar. Moreover, in alternative embodiments display layer 21 may be a different thickness and/or may be of a varying thickness.

Coupled to back surface 24 of display layer 21 and forming part of each key top 20 is a plastic layer 30. In some embodiments of the invention the plastic layer may be poly(methyl methacrylate) (PMMA). In other embodiments, plastic layer 30 may comprise another plastic, such as, for example, nylon, polycarbonate, or acrylic fiber. In the depicted embodiment of FIG. 1 through FIG. 4 plastic layer 30 extends beyond the entire periphery of display layer 21. In other embodiments plastic layer 30 may extend only beyond portions of the periphery of display layer 21 or may not extend beyond the periphery at all. In the first embodiment a top upward facing surface of plastic layer 30 is substantially planar with display layer 21. In other embodiments the top upward facing surface of plastic layer 30 may be above or recessed below display layer 21.

Figure 2:
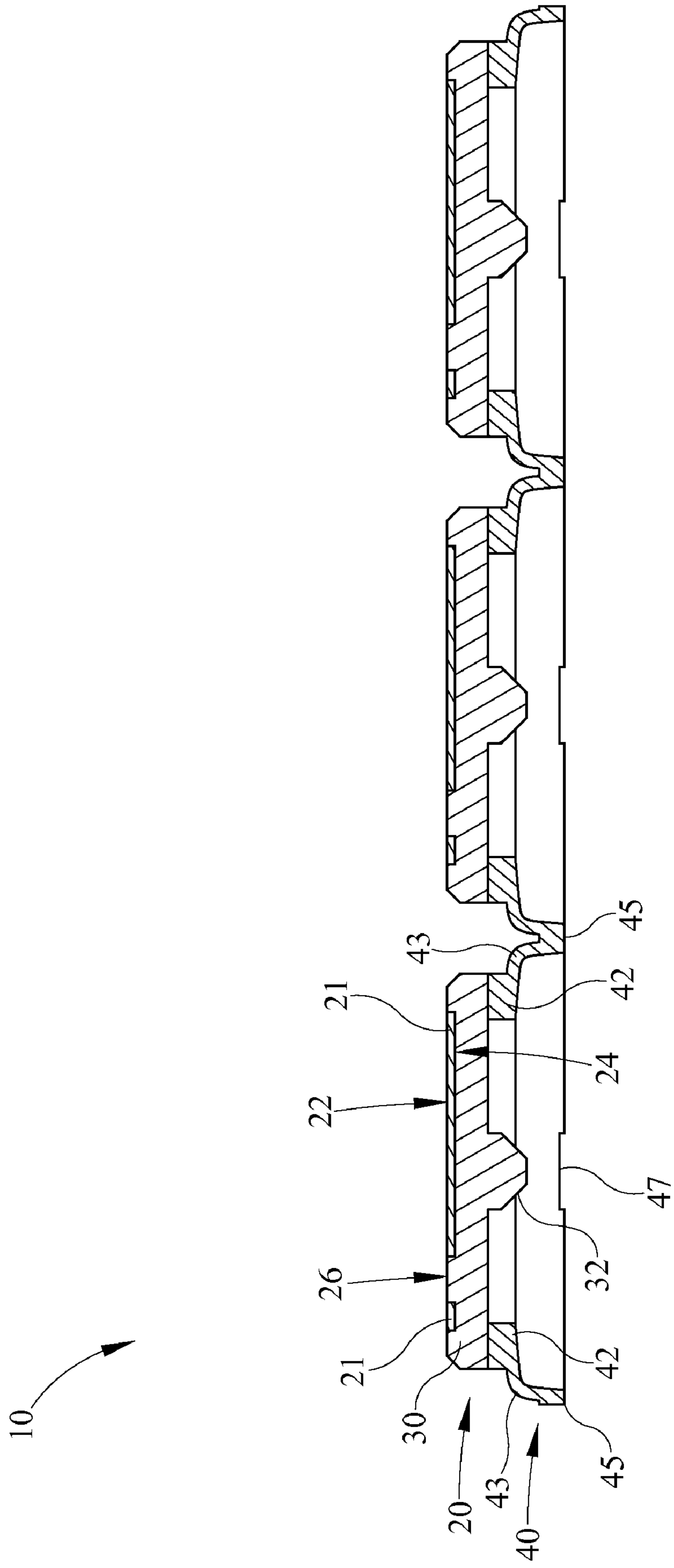
FIG. 2 is a side view of the multi-layer integral keypad of FIG. 1 taken along the line 2-2.

Symbols may also be provided on key tops 20. In some embodiments one or more symbols 26 are provided through display layer 21 of key tops 20. In some embodiments display surfaces 22 are additionally or alternatively printed with symbols. The depicted symbols 26 are circular apertures provided through display layer 21 of key tops 20 and are merely provided for exemplary purposes. With particular reference to FIG. 2, it is seen that plastic layer 30 may fill the apertures that create symbols 26. In other embodiments symbol 26 may be unfilled or overfilled to provide tactile feel to a user. Ideally, each symbol 26 is distinct from any symbols on adjacent display surfaces 22 and conveys meaningful information to a user. Such symbols include, but are not limited to, numbers, letters, words, Braille, and graphical depictions. In some embodiments one or more symbols 26 that provide meaningful information to a user are provided as apertures through metal layers 21 and an aesthetically pleasing graphic is printed across one or more display surfaces 22 of metal layers 21. There are various methods and apparatuses for forming apertures in a display layer 21 which may be used to form symbol 26. Among these are the methods and apparatuses described in United States Patent Application Publication No. 2006/0019065, published on Jan. 26, 2006, and naming Taemmerich and Bruennel as inventors, which is hereby incorporated in its entirety by reference. The apparatus and method described in United States Patent Application Publication No. 2006/0019065 enables a web free symbol to be created in a metal layer of an ornamental part.

Plastic layer 30 may be transparent, translucent, or opaque. In embodiments where plastic layer 30 is transparent or translucent it will be appreciated that multi-layer integral keypad 10 may be installed over one or more light sources that are in optical communication with plastic layer 30 of one or more key tops 20 to illuminate one or more plastic layers 30. For example, in some embodiments one or more electroluminescent panels, including, but not limited to, CeeLite's Light Emitting Capacitor, may be provided on a keyboard mounting surface or base and the multi-layer integral keypad 10 installed over the electroluminescent panels. Thus, those plastic layers 30 in optical communication with the electroluminescent panels will be illuminated and portions of those illuminated plastic layers 30 will be visible to a user. This includes, but is not limited to, the portions of plastic layer 30 that surround display layer 21 in some embodiments. This also includes, but is not limited to, any symbols 26 through which plastic layer 30 is visible. In other embodiments other light source may be used to illuminate plastic layer 30 of some or all of key tops 20 such as, for example, one or more light emitting diodes.

Figure 3:
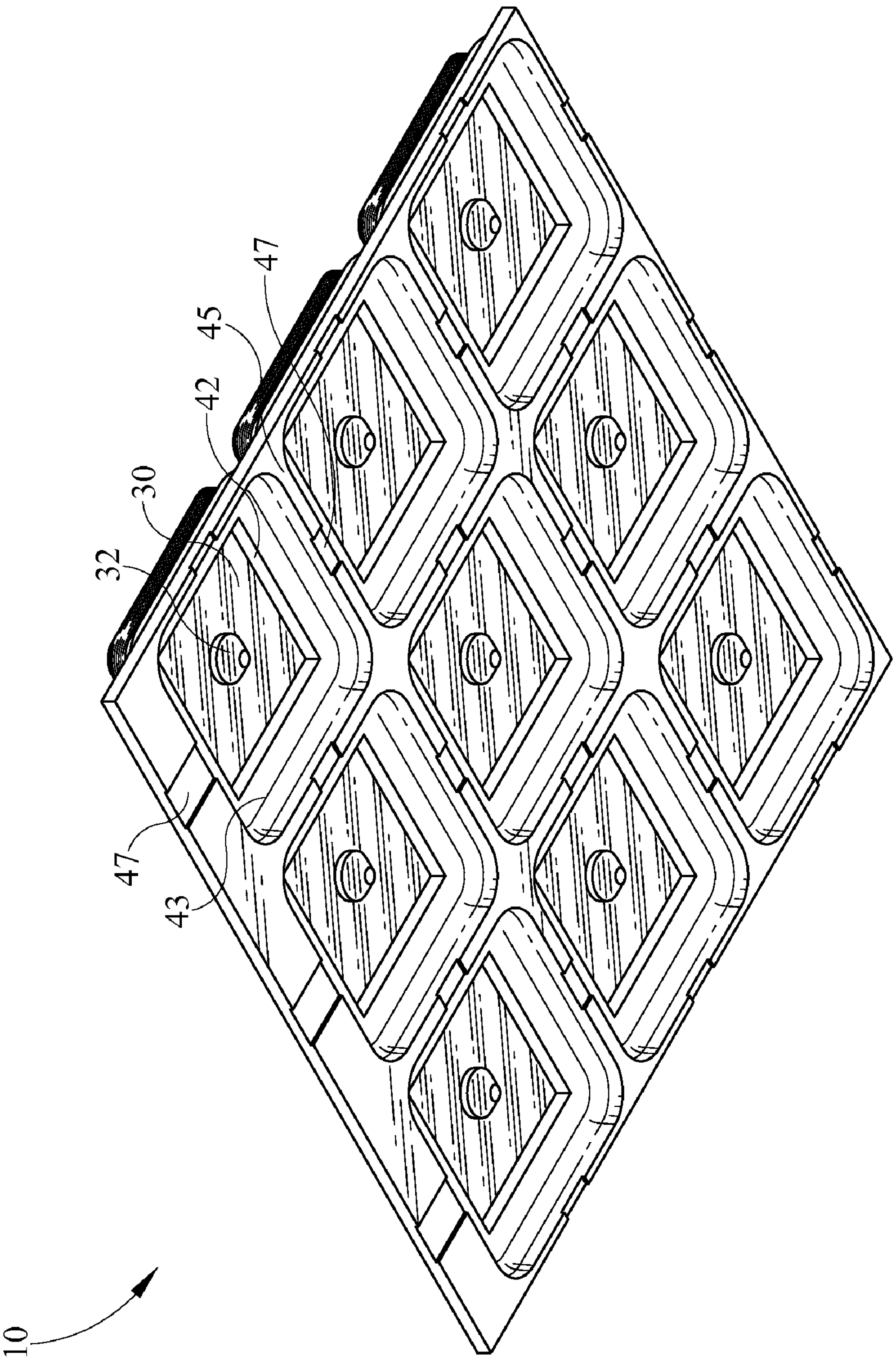
FIG. 3 is a bottom perspective view of the multi-layer integral keypad of FIG. 1.
Figure 4:
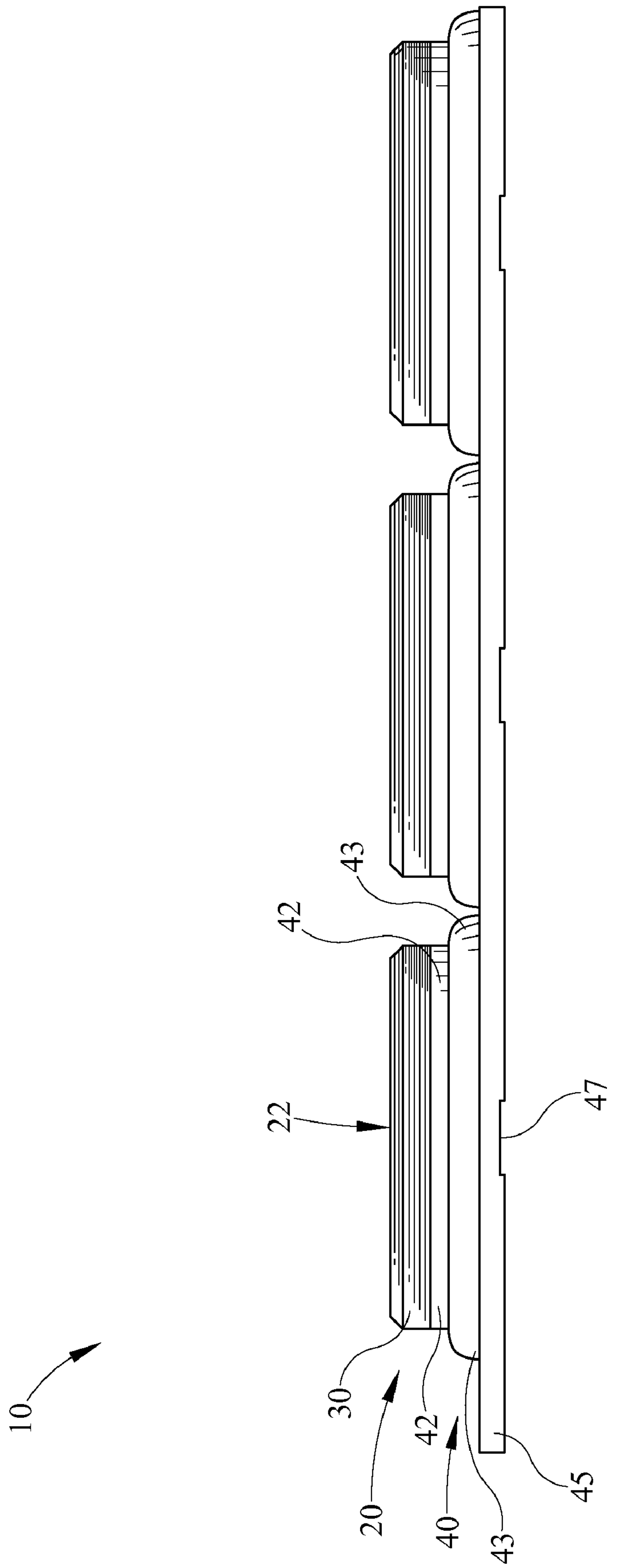
FIG. 4 is a side view of the multi-layer integral keypad of FIG. 1.

In some embodiments a actuating structure forms part of plastic layer 30. Referring to FIG. 2 and FIG. 3, actuating structure 32 is shown extending in a direction downward and away from back surface 24 of the metal layer of each key top 20. The depicted actuating structure 32 is a substantially frusto-conical protrusion designed to interact with a corresponding come switch supported on an electronic keyboard mounting surface. Multi-layer integral keypad 10 is configured to interact with switches used with electronics, such as, for example, switches for keyboards, appliances, and other electronics. The switches and electronic devices multi-layer integral keypad 10 may be configured to interact with are numerous and actuating structure 32 may be adjusted to provide for interaction with any such switch and/or electronic device. For example, in some embodiments actuating structure 32 may be a recessed or flat surface instead of a protrusion. Also, for example, in some embodiments actuating structure 32 may be configured to interact with a dome-switch keyboard. In other embodiments actuating structure 32 may be configured to interact with a scissor-switch keyboard. Also, for example, in other embodiments actuating structure 32 may comprise a magnet and be configured to interact with a Hall Effect sensor switch.

With continuing reference to FIGS. 1 through 4, a key top support layer 40 is coupled to each key top 20 and integrally connects each key top 20 to one another. In the embodiment of FIGS. 1 through 4, key top support layer 40 has a rectangular key top support section 42 that is coupled to plastic layer 30 of key tops 20. The key top support section 42 is connected to an arcuate and convex leg section 43 and the leg section 43 is connected to a key top base 45. Key top support section 42 is coupled to each plastic layer 30 along a periphery thereof and surrounds actuating structure 32. Key top support section 42 and leg section 43 collectively extend from key top 20 to base 45, placing key top support 20 in a different plane than base 45. Key top support layer is a resilient material that allows key top 20 to be in a stationary position when no force is applied to key top 20 by a user and to allow key top 20 to be in an activation position closer to base 45 when a predetermined force is applied to key top 20 by a user. Key top support 42 has an attachment area coupled to the base of plastic layer 30 and does not extend entirely under plastic layer 30. When multi-layer integral keypad 10 is installed on an electronic device having a plurality of switches, actuating structure 32 does not contact a corresponding switch when key top 20 is in the stationary position. When a predetermined force is applied by a user and key top 20 moves closer to base 45, actuating structure 32 contacts a corresponding switch on the electronic device. The design of key top support layer 40 allows each key top 20 to move from a stationary to an activation position without causing adjacent key tops 20 to also move to an activation position.

In the embodiment of FIGS. 1 through 4, base 45 connects key top supports 42 to one another and supports arcuate leg section 43 and key top support section 42. When multi-layer integral keypad 10 is installed on an electronic device having a plurality of switches, base 45 also provides a surface that can contact a corresponding mounting surface of the electronic device. Base 45 may also provide counterpressure to force supplied by a user on key top 20. In some embodiments base 45 may be adhered to a corresponding mounting surface or may have protrusions, snaps, receptacles, or other securing devices that interact with a corresponding mounting surface to secure multi-layer integral keypad 10 to the mounting surface. Base 45 may also be provided with air passageway notches 47 that allow air to enter and exit therethrough when key top 20 moves between a stationary and activation position. Air passageways 47 minimizes vacuum when key tops 20 move between the stationary and activation positions. In other embodiments air passageways 47 may be omitted. In some embodiments air passageways may be provided through key tops 20, key top supports 42, or the electronic device with which multi-layer integral keypad is installed.

Key top support layer 40 may be comprised of any one of a variety of resilient materials of a durometer that is appropriate to enable a user to contact and depress a key top 20 and to provide tactile feedback to a user. Such materials include, but are not limited to, ethylene propylene diene Monomer rubber (EPDM), Thermoplastic elastomer (TPE), and ThermoPlastic Olefin (TPO). In some embodiments, such as those shown in the Figures, each key top support 42 and base 45 of key top support layer 40 are coupled to each key top 20 and to one another without any openings or gaps, so as to form a water and/or debris resistant multi-layer integral keypad 10. When multi-layer integral keypad 10 is installed on an electronic device having a plurality of switches, water or debris that falls between key tops 20 will contact support layer 40 and will not immediately contact any internal electronics of the electronic device. It will be appreciated that the periphery of multi-layer integral keypad 10 may be appropriately installed and sealed with an electronic device so as to make the entire electronic device more water and/or debris resistant.

The configuration of key top support layer 40 and multi-layer integral keypad 10 may vary in many respects to accommodate varying electronic devices. For example, laptop keys have shorter travel distance for the keystroke than desktop keyboard keys. Thus, key top support layer 40 may be made "taller" or "shorter" and configured for either. Also, for example, actuating structure 32 may be adjusted dependent on keystroke distance. Likewise, for example, different amounts of spacing between key tops 20 may be required for different keyboards or other electronic devices.

Figure 5:
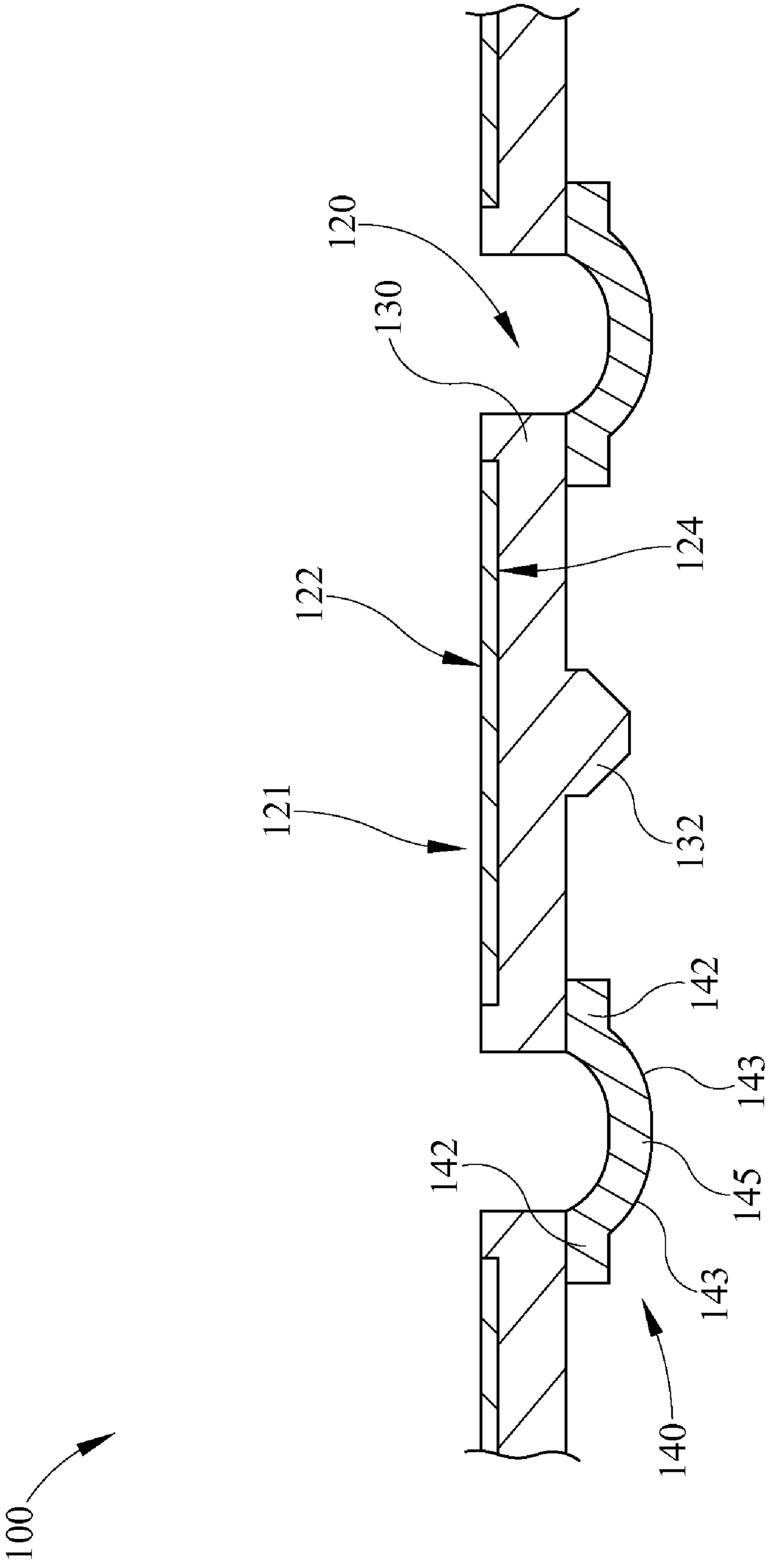
FIG. 5 is a section view of a second embodiment of a multi-layer integral keypad.

Referring to FIG. 5, a section view of a second embodiment of a multi-layer integral keypad 100 is depicted. Multi-layer integral keypad 100 has metal layers 121 with a display surface 122 and a back surface 124. Each metal layer 121 does not have any symbols provided therethrough. Plastic layer 130 is coupled to back surface 124 and extends beyond the periphery of the metal layer. Plastic layer 130 has a actuating structure 132 extending downward and away from back surface 124 of metal layer 121. Plastic layer 130 has edges that are at right angles, unlike the upper beveled edges of plastic layer 30 visible in FIG. 2. Key top support layer 140 also varies from support layer 40 depicted in FIG. 2. A key top arcuate leg 143 has a concave, as opposed to convex, shape. Base 145 also varies in its configuration and is more rounded. Also, the distance between key top 120 and base 145 is less than in the first embodiment of FIGS. 1 through 4.

Figure 6:
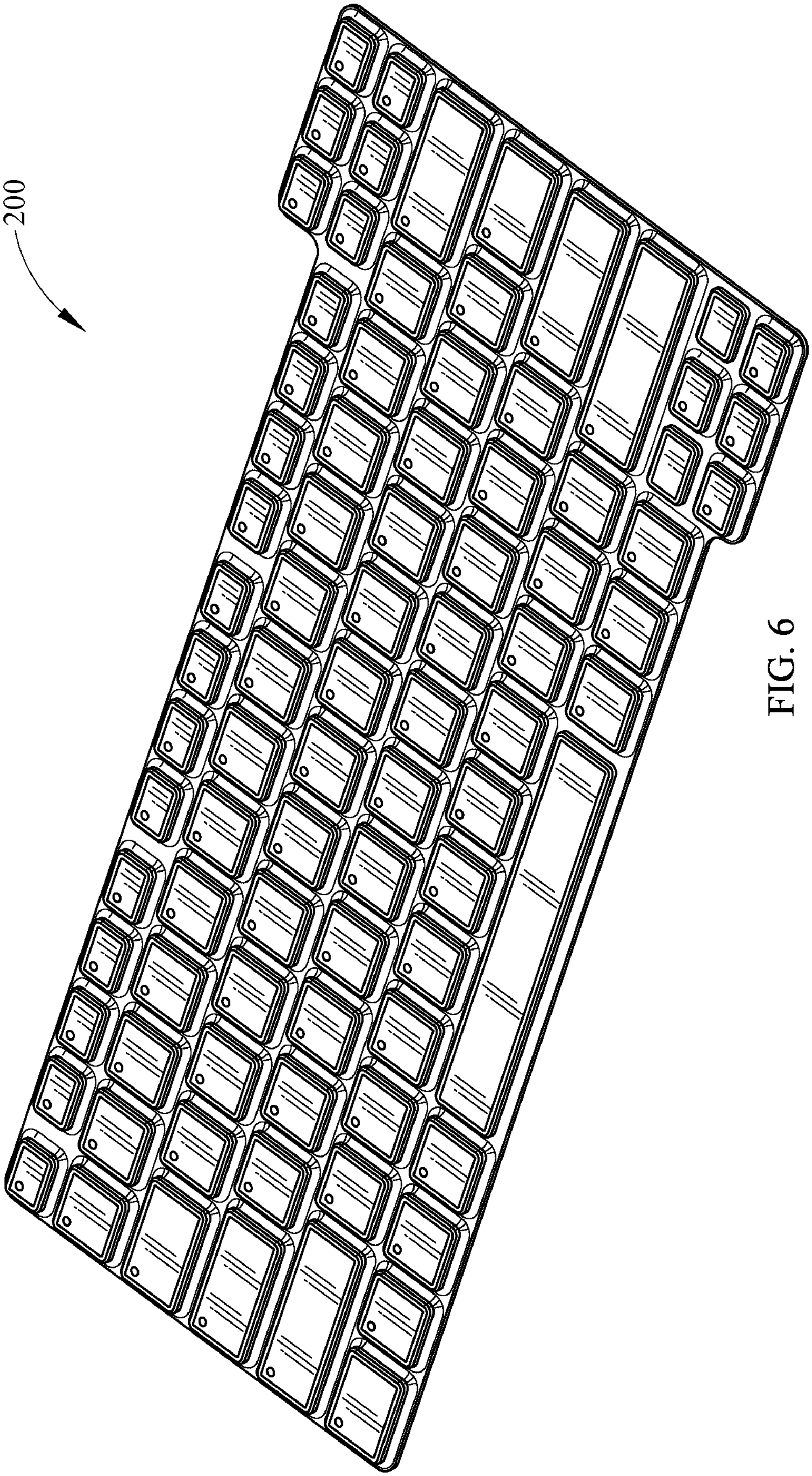
FIG. 6 is top perspective view of a third embodiment of a multi-layer integral keypad.

Referring to FIG. 6, a top perspective view of an additional embodiment of a multi-layer integral keypad 200 is depicted. Multi-layer integral keypad 200 is configured for use with a keyboard, such as, for example, a laptop keyboard. Multi-layer integral keypad 200 is formed without any openings or gaps, so as to be a water and/or debris resistant multi-layer integral keypad.

Figure 7:
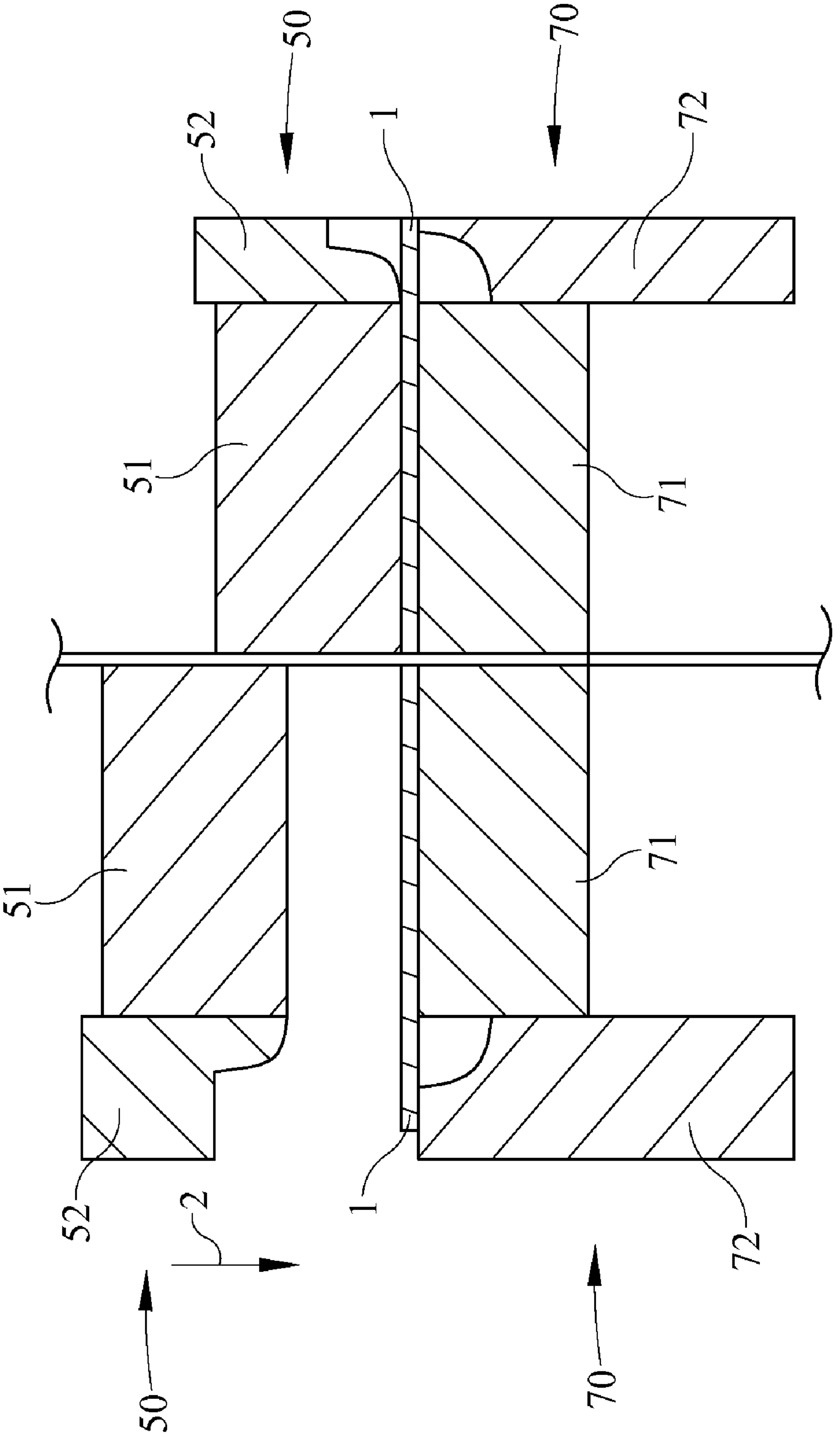
FIG. 7 is a section through a portion of a mold in two different, successive steps in a first embodiment of a method for producing a multi-layer integral keypad.
Figure 8:
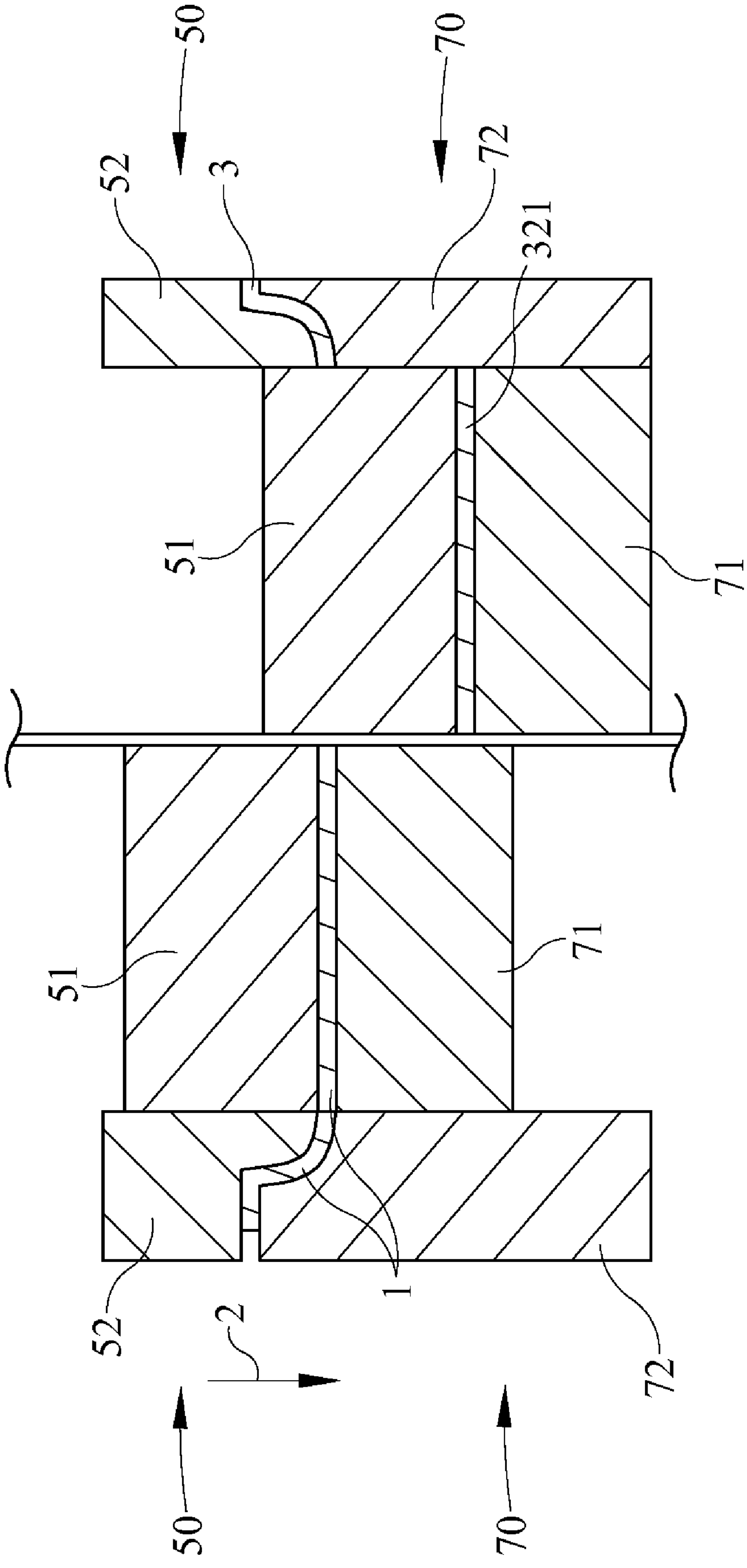
FIG. 8 is a section through a portion of a mold in two different, successive steps in the first embodiment of a method for producing a multi-layer integral keypad.
Figure 9:
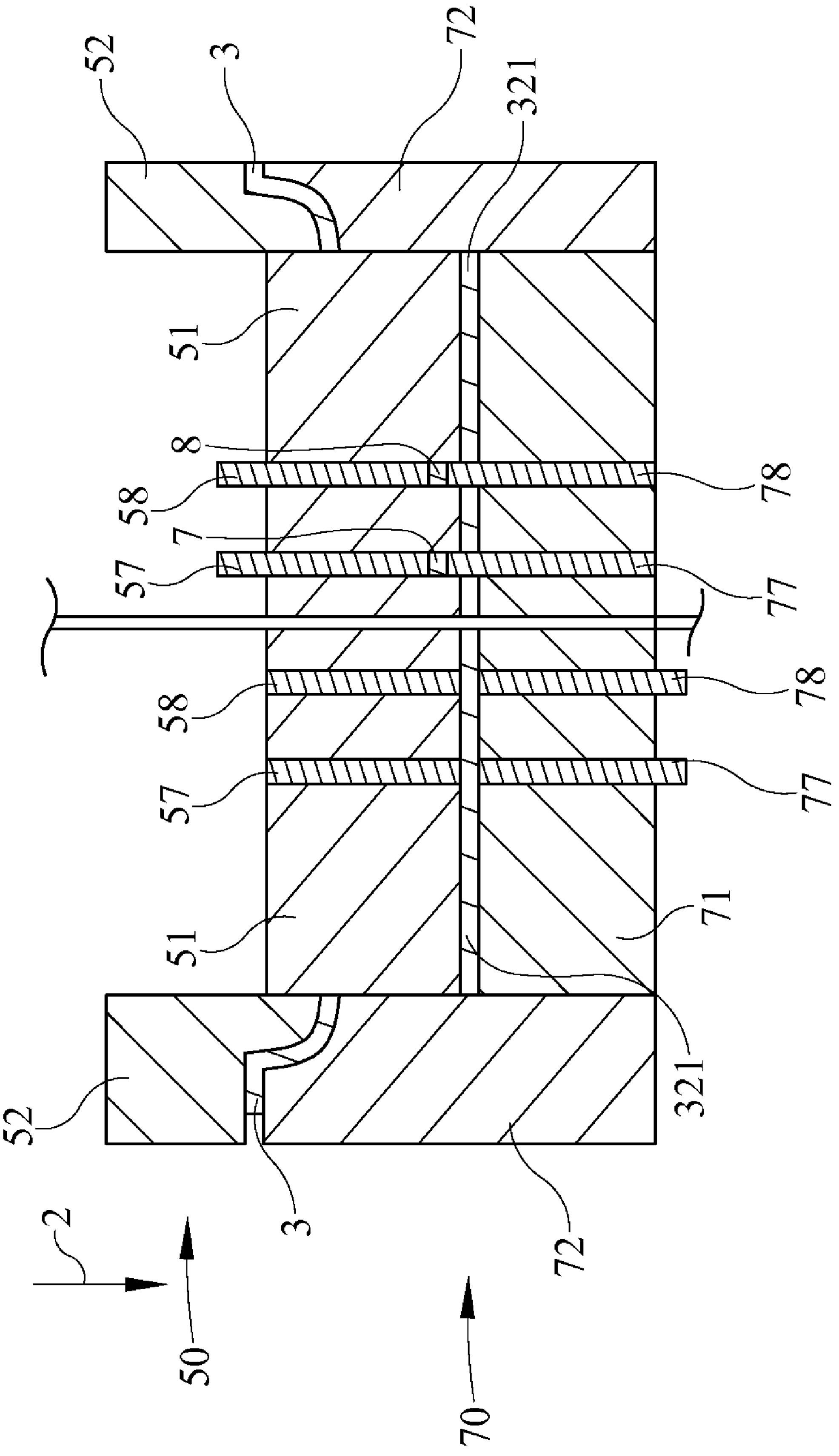
FIG. 9 is a section through a portion of a mold in two different, successive steps in the first embodiment of a method for producing a multi-layer integral keypad.
Figure 10:
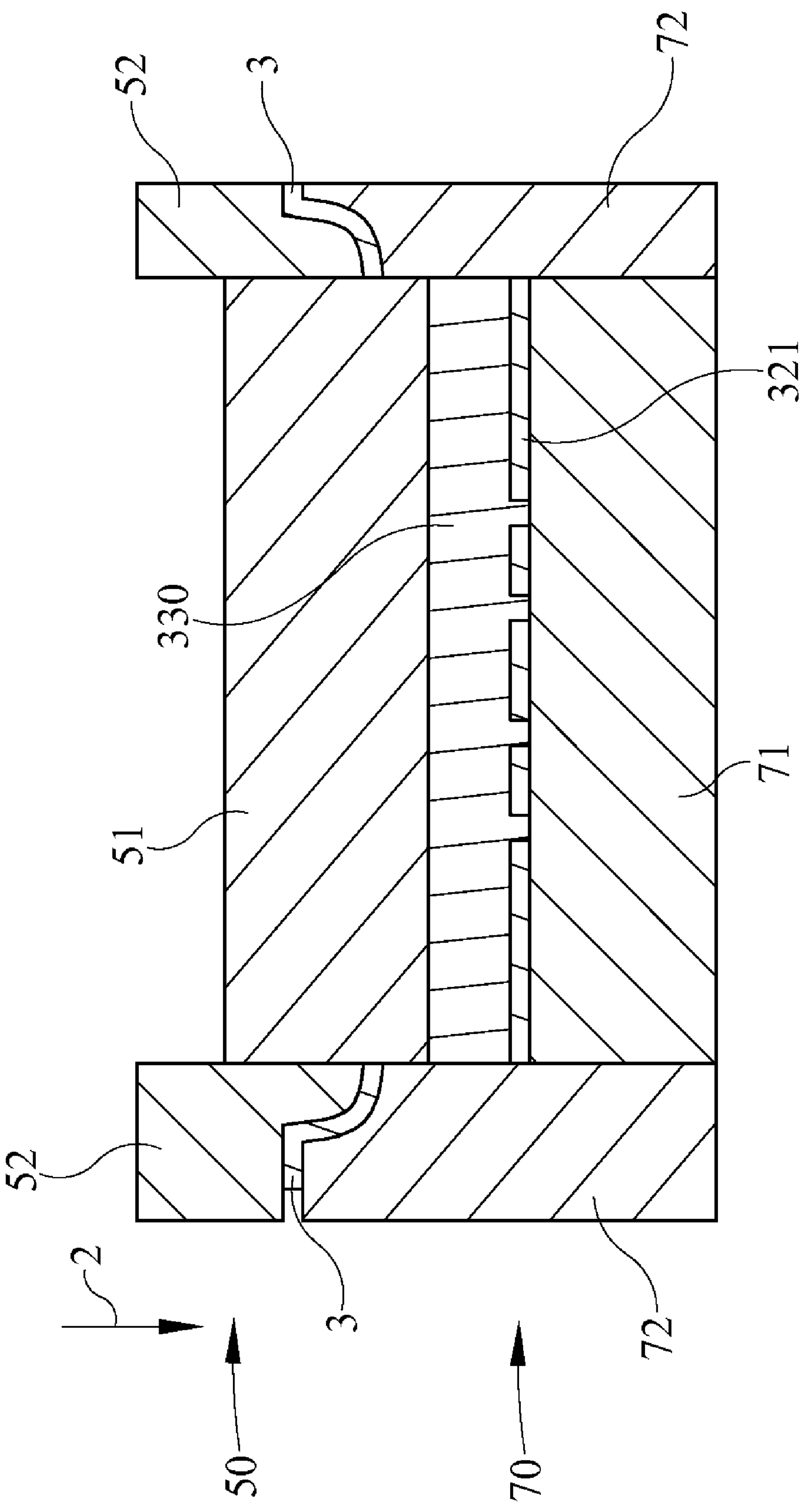
FIG. 10 is a section through a portion of a mold in the first embodiment of a method for producing a multi-layer integral keypad.
Figure 11:
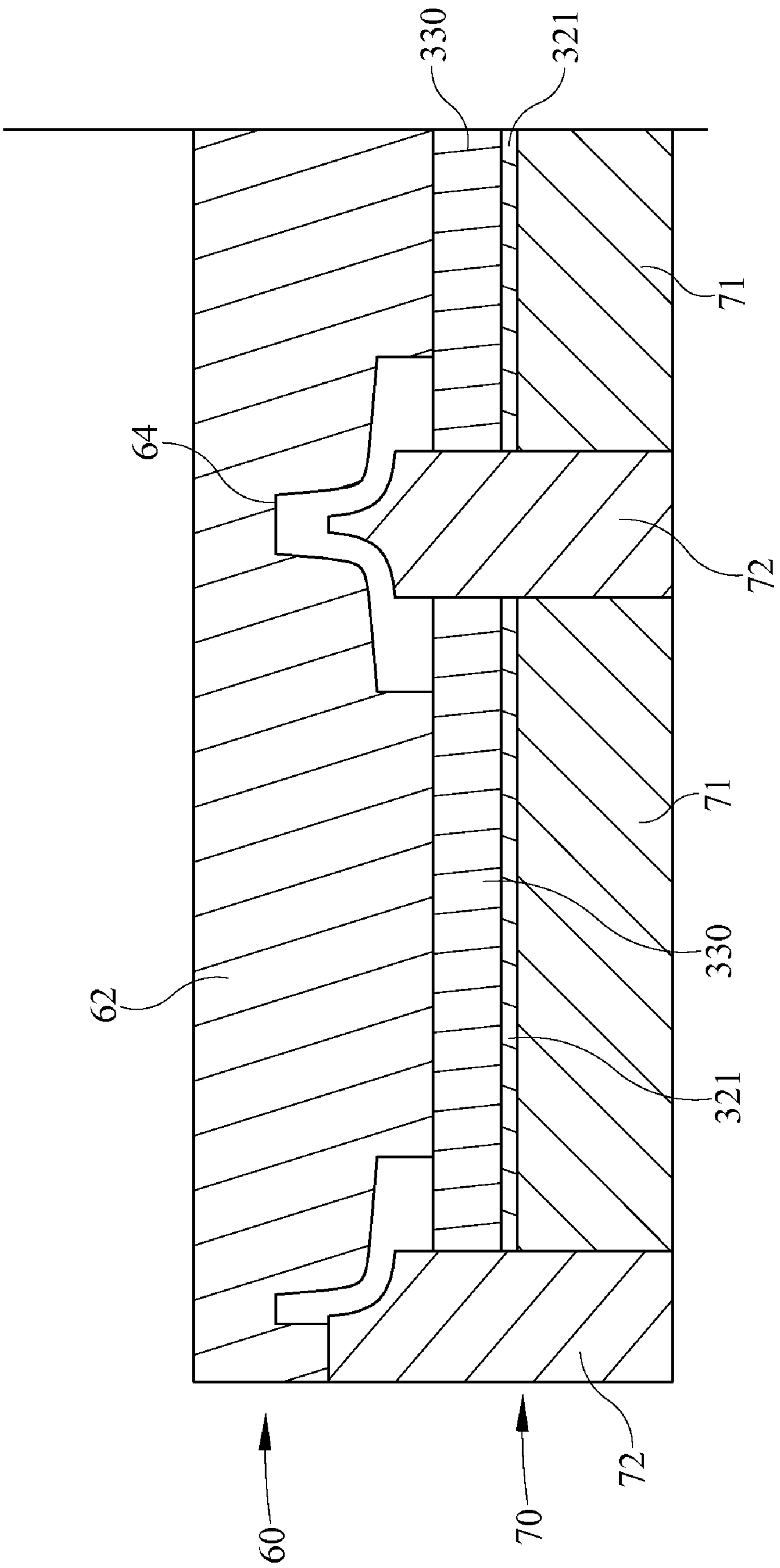
FIG. 11 is a section through a portion of a mold in the first embodiment of a method for producing a multi-layer integral keypad.
Figure 12:
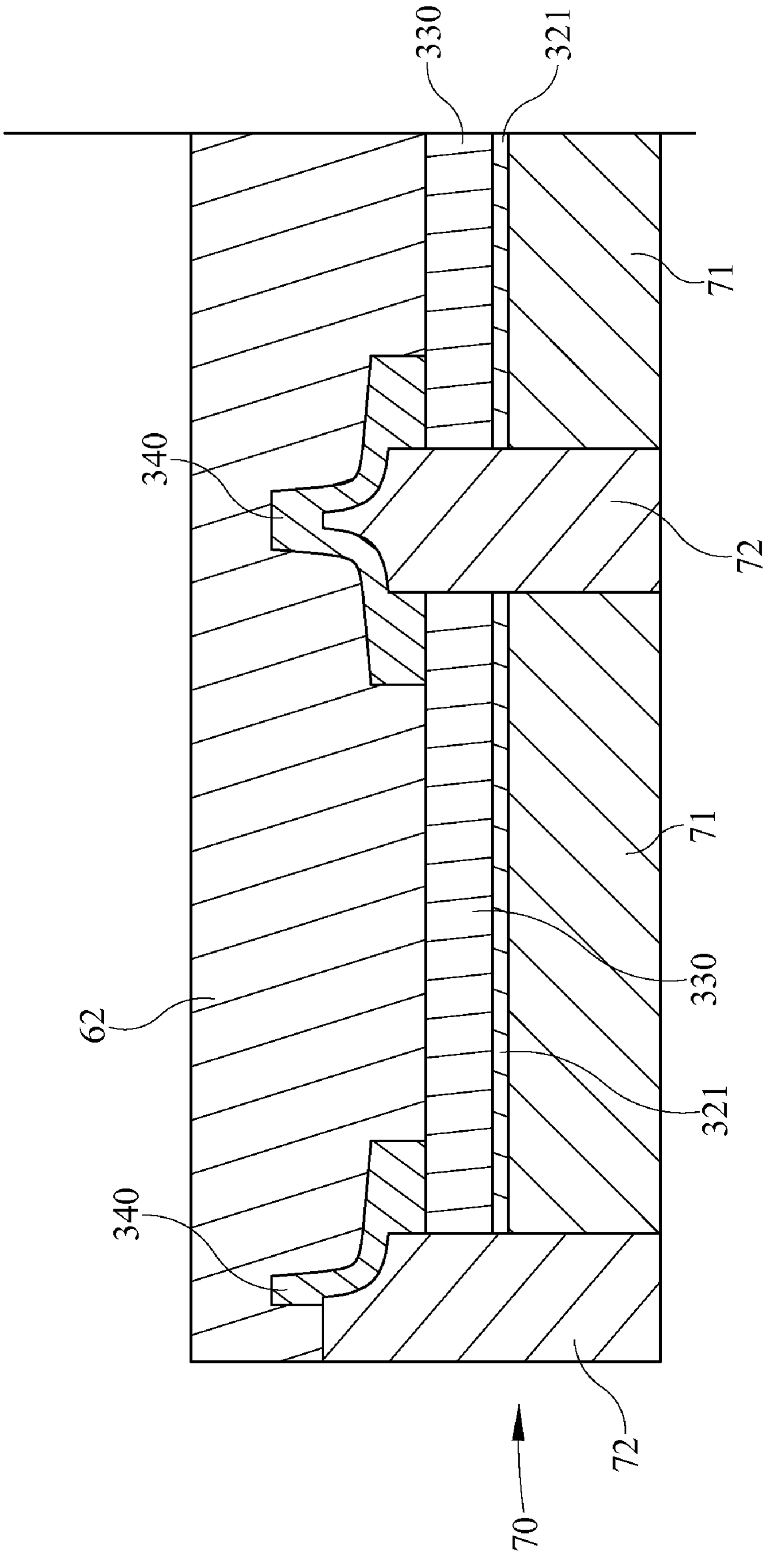
FIG. 12 is a section through a portion of a mold in the first embodiment of a method for producing a multi-layer integral keypad.

Referring now to FIG. 7 through FIG. 12, an embodiment of a process for producing a multi-layer integral keypad is depicted. With regard to FIGS. 7 through 9 it should generally be noted that each Figure consists of two half sections of a portion of a mold and the sequence in time of the operation of the mold has to be read in each case from left to right. Thus, the left half section in FIG. 7 shows a first operating state which after a certain time passes over into the second operating state shown in the right half section of FIG. 7. The same applies to FIG. 8 where the timing of the left half section directly follows the right half section of FIG. 7 and the right half section of FIG. 8 shows another sequence in the method which in turn, viewed in terms of time, passes over into the left half section of FIG. 9. This is then followed in time by the right half section of FIG. 9. FIGS. 10 through 12 present further operating states of the mold, but are not presented in half sections. Thus the right half section of FIG. 9 will be followed in time by FIG. 10, FIG. 10 will be followed in time by FIG. 11, and FIG. 11 will be followed in time by FIG. 12.

It should also be noted that FIGS. 7 through 10 depict interactions within a single mold cavity of a mold and FIGS. 11 and 12 depict interactions within two adjacent mold cavities of a mold. One mold cavity and two mold cavities are shown for simplicities sake only. Any numbers of mold cavities may be provided neighboring one another and in a variety of configurations in a mold in order to form a multi-layer integral keypad. The methods taught by FIGS. 7 through 12 may be adapted for use with any number and configuration of mold cavities and any configuration of multi-layer integral keypad. Also, the methods taught by FIG. 7 through FIG. 10 may be better understood with reference to United States Patent Publication Application No. 2006/0019065.

Referring now to the left half section of FIG. 7, a sheet of metal 1 is placed between an upper part of a mold 50 and a lower part of a mold 70. Upper part of a mold 50 is provided with an upper forming punch 51 that is movable in a first direction indicated by arrow 2 and in a second direction opposite the direction indicated by arrow 2. A die 52 is formed independently of upper forming punch 51 and can also move in a first direction indicated by arrow 2 and in a second direction opposite the direction indicated by arrow 2. Lower part of a mold 70 is provided with a cushion 71 and a forming die 72 that form a mold cavity. Referring now to the right half section of FIG. 7, forming punch 51 and die 52 move in the direction of arrow 2 and abut sheet of metal 1.

Referring now to the left half section of FIG. 8, forming punch 51 and die 52 move further in the direction of arrow 2 and cause a deformation in sheet of metal 1. Cushion 71 is also displaced in the direction of arrow 2. Referring now to the right half section of FIG. 8, forming punch 51 moves even further in the direction of arrow 2 and into the mold cavity formed by cushion 71 (shown further displaced in the direction of arrow 2) and forming die 72. Sheet of metal 1 is cut into scrap piece 3 and metal layer 321 as a result of interaction between forming punch 51 and forming die 72.

Referring now to the left half section of FIG. 9, stamping parts 77 and 78 are shown with corresponding ejector parts 57 and 58. Referring now to the right half section of FIG. 9, stamping parts 77 and 78 are also shown on the right half section with corresponding ejector parts 57 and 58, although in some embodiments any stamping parts provided on the right half side may vary from those provided on the left half side. Stamping parts 77 and 78 are moved in a direction opposite the direction of arrow 2 and cuts are made in metal layer 321. Ejector parts 57 and 58 may provide counterpressure for this cut. Scrap pieces 7 and 8 from stamping parts 77 and 78 are shown with corresponding ejector parts 57 and 58 and may be removed when forming punch 51 is removed.

Referring now to FIG. 10, forming punch 51 is separated from metal layer 321. A plastic layer 330 has been deposited into the gap formed between forming punch 51 and metal layer 321. In some embodiments plastic layer 330 may be injected by a gate funnel (not shown) provided through forming punch 51. The symbols formed by stamping parts 77 and 78 have been filled by plastic layer 330.

Stamping parts may be used to create a variety of symbols through metal layer 321, including web free symbols, and to cause metal layer 321 be a variety of shapes. For example, stamping parts, such as stamping parts 77 and 78 may be left within the apertures they create through metal layer 321, while plastic layer 330 is deposited to aide in the creation of web free symbols. Also, for example, any apertures created may be unfilled, partially filled, or completely filled with plastic layer 330. Also, for example, stamping parts may be used to cut out all or portions of the outer periphery of metal layer 321 if it is desired to have plastic layer 330 extend beyond the outer periphery of metal layer 321.

Referring now to FIG. 11, one entire mold cavity is shown interposed between two forming dies 72 and half of a second mold cavity is shown to the right of the rightmost forming die 72. Again, two mold cavities are shown only for simplicity and any number of mold cavities may be provided. Mold upper part 60 is moved into place over plastic layer 330. Mold upper part 60 has a key top support mold 62 with a plurality of key top support gaps 64 provided therein. Referring now to FIG. 12, resilient material 340 may be injected into each key top support gap 64 and allowed to cure. In some embodiments resilient material 340 is injected by a gate funnel (not shown) provided through key top support mold 62. In some embodiments resilient material is EPDM. The leftmost resilient material portion depicted in FIG. 12 is representative of an edge of a multi-layer integral keypad and does not connect to anything to the left of leftmost forming die 72 (although the leftmost resilient material may be coupled to other metal layers 321 and plastic layers 330 that would be visually in front or behind of the section view shown). Once resilient material 340 has been allowed to cure, all metal layers 321 and plastic layers 330 will be coupled to one another to form an integral whole and multi-layer integral keypad produced.

The foregoing description has been presented for purposes of illustration. It is not intended to be exhaustive or to limit the invention to the precise forms disclosed, and obviously many modifications and variations are possible in light of the above teaching. It is understood that while certain forms of the multi-layer integral keypad have been illustrated and described, it is not limited thereto except insofar as such limitations are included in the following claims and allowable functional equivalents thereof.

We claim:

1. A multilayer integral keypad for actuating a plurality of switches of an electronic device, comprising:
- a plurality of key tops, at least some of said key tops having a display layer and a plastic layer, said plastic layer being different than said display layer;
  - said display layer having an upward facing display surface and a downward facing back surface;
  - said plastic layer coupled to said back surface of said display layer and having an actuating structure extending downward and away from said display layer;
- a resilient key top support layer, said key top support layer being different than said display layer and said plastic layer and coupled to said plastic layer of said key tops and integrally connecting said key tops to one another; said key top support layer having an arcuate support layer leg section extending downward and away from said key tops toward a support layer base;
- wherein said key top support layer extends only partially underneath said key tops;
- wherein said key top support layer is configured to allow said key tops to be in a stationary position when no force is applied to said key tops by a user and to allow a single of said key tops to be in an activation position and actuate at least one of the switches when a predetermined force is applied to said single of said key tops; and
- wherein the entirety of said key top support layer is downward and below said display layer.

2. The multilayer integral keypad of claim 1, wherein said display layer of said key tops has at least one aperture therethrough.

3. The multilayer keypad for engaging a plurality of switches of claim 2, wherein said plastic layer is translucent.

4. The multilayer keypad for engaging a plurality of switches of claim 3, wherein said aperture is filled by said plastic layer.

5. The multilayer integral keypad of claim 1, wherein said key top support layer is coupled to a downward facing surface of said plastic layer.

6. The multilayer integral keypad of claim 1, wherein said leg section is convex.

7. The multilayer integral keypad for engaging a plurality of switches of claim 6, wherein said plastic layer of a plurality of said key tops is translucent and extends around the periphery of said display layer.

8. A multilayer keypad for interfacing with a plurality of switches, comprising:
- a plurality of key tops, at least two key tops of said key tops having a display layer, a translucent plastic layer, said plastic layer different than said display layer;
  - each said display layer having an upwardly facing display surface and a downward facing back surface;
  - each said plastic layer having an upper surface coupled to said back surface of said display layer and a downward facing lower surface;
  - wherein an actuating structure is formed in said lower surface of said plastic layer and positioned over one of said switches;
- a resilient key top support layer coupled to said plastic layer of said at least two key tops and integrally connecting said at least two key tops to one another; said key top support layer having a support layer arcuate leg section extending downward and away from said at least two key tops toward a support layer base;
- wherein said key top support layer is operable to allow said at least two key tops to be in a stationary position when no force is applied to said at least two key tops and to allow a single of said at least two key tops to be in an activation position and actuate at least one of said switches when a predetermined force is applied to said single of said at least two key tops;
- wherein said key top support layer is configured to be free from contact with any of said switches in said stationary position and in said activation position; and
- wherein the entirety of said key top support layer is downward and below said display layer.

9. The multilayer keypad for interfacing with a plurality of switches of claim 8, wherein said plastic layer extends beyond the periphery of said display layer.

10. The multilayer keypad for interfacing with a plurality of switches of claim 9, wherein said actuating structure comprises a protrusion extending in a direction downward and away from said lower surface of said plastic layer.

11. The multilayer keypad for interfacing with a plurality of switches of claim 10, wherein said actuating structure is integrally formed with said lower surface of said plastic layer.

12. A multilayer integral keypad for actuating a plurality of switches, comprising
- a plurality of key tops, each of said key tops having a metal layer and a translucent plastic layer, said metal layer of each of said key tops having a display surface and a back surface, and said plastic layer of each of said key tops coupled to said back surface of said metal layer and having an actuating structure extending in a direction downward and away from said back surface of said metal layer;
- a resilient key top support layer, said key top support layer coupled to said plastic layer of each of said key tops and surrounding each said actuating structure of each of said key tops;
- said key top support layer having an arcuate leg section extending downward from each said plastic layer to a key top base;
- wherein the entirety of said key top support layer is downward and below said metal layer and wherein said key top support layer extends only partially underneath said key tops; and
- wherein said key top support layer is configured to allow a plurality of said key tops to be in a stationary position when no force is applied to said key tops and to allow a single of said key tops to be in an activation position and actuate at least one of the switches when a predetermined force is applied to said single of said key tops.

13. The multilayer integral keypad of claim 12, wherein said metal layer of said key tops has at least one aperture therethrough.

14. The multilayer integral keypad of claim 12, wherein said leg section is convex.

15. The multilayer integral keypad of claim 14, wherein said key top support layer is coupled to a downward facing surface of said plastic layer.

16. The multilayer integral keypad of claim 15, wherein said plastic layer of a plurality of said key tops is translucent and extends around the periphery of said metal layer.

17. The multilayer integral keypad of claim 16, wherein said metal layer is aluminum.

18. A method for producing a multilayer integral keypad, comprising the steps of:

placing a sheet of metal over a plurality of mold cavities arranged according to a predetermined keypad layout;

inserting at least one forming punch into said plurality of mold cavities to cut said sheet of metal into a plurality of individual metal layers;

maintaining said plurality of metal layers in said mold cavities and depositing a plastic layer onto each of said metal layers;

depositing a resilient material layer onto each said plastic layer so that said resilient material layer attaches each said plastic layer to any adjacent said plastic layer, to form a multilayer integral keypad for actuating a plurality of switches comprising:

a plurality of key tops, each of said key tops having a metal layer and a translucent plastic layer, said metal layer of each of said key tops having a display surface and a back surface, and said plastic layer of each of said key tops coupled to said back surface of said metal layer and having an actuating structure extending in a direction downward and away from said back surface of said metal layer;

a resilient key top support layer, said key top support layer coupled to said plastic layer of each of said key tops and surrounding each said actuating structure of each of said key tops;

said key top support layer having an arcuate leg section extending downward from each said plastic layer to a key top base;

wherein the entirety of said key top support layer is downward and below said metal layer and wherein said key top support layer extends only partially underneath said key tops; and wherein said key top support layer is configured to allow a plurality of said key tops to be in a stationary position when no force is applied to said key tops and to allow a single of said key tops to be in an activation position an actuate at least one of the switches when a predetermined force is applied to said single of said key tops.

19. The method for producing a multilayer integral keypad of claim 18, further comprising the step of coupling said resilient material layer to a keypad support surface.

20. The method for producing a multilayer integral keypad of claim 18, wherein said plastic layer includes an actuating structure.

21. The method for producing a multilayer integral keypad of claim 18, wherein said resilient material layer is deposited on only a portion of each said plastic layer.

* * * * *